April 18, 1967 J. TALAMONTI 3,314,681

SEAL WITH DEFLECTOR MEANS

Filed June 22, 1964

Inventor
John Talamonti
By John W Butcher
Att'y.

United States Patent Office 3,314,681
Patented Apr. 18, 1967

3,314,681
SEAL WITH DEFLECTOR MEANS
John Talamonti, Chicago Heights, Ill., assignor to Borg-Warner Corporation, Chicago, Ill., a corporation of Illinois
Filed June 22, 1964, Ser. No. 376,949
2 Claims. (Cl. 277—42)

This invention relates to annular fluid seal devices, and more particularly, to a cartridge type face seal having a deflector shroud associated therewith.

It is normal practice to fix the retainer portion of the face seal to the pump housing. A pump shaft extends through a central opening in the retainer and carries an impeller hub which hub is normally provided with a radially extending sealing surface. The sealing washer is maintained in engagement with this radially extending sealing surface.

A problem exists when pumping certain types of fluids which fluids contain abrasive materials. The problem is believed to be caused by the abrasive material impinging against the radially extending sealing surface near the sealing washer and subsequently lodging therebetween thereby causing wear and premature failure of the seal assembly. Attempts have been made to eliminate this problem by extending the retainer member axially forwardly over the sealing washer to form a shroud (see U.S. Patent 2,598,886, Brummer). Although the use of a metallic shroud as shown in U.S. Patent 2,598,886 generally results in improved life of the seal, it also results in increased cost of the seal as well as complicates the process of assembly thereof.

Briefly described, the present invention utilizes a flexible boot member, a portion of which extends axially forwardly past the face of the sealing washer to provide a means to protect the face of the sealing washer from exposure to the fluid being circulated by the impeller.

Other features of this invention will be apparent from the following detailed description taken together with the accompanying drawings, in which.

Figure 1:
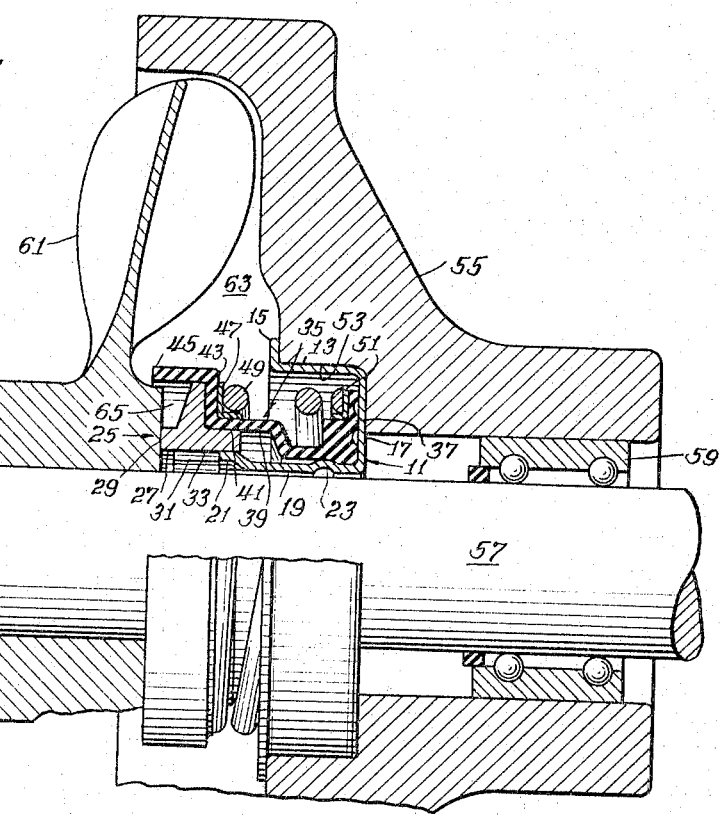
FIGURE 1 is a side view, partially in cross-section, of the seal assembly.

Referring now to the drawing and, more particularly, FIGURE 1, a metallic shell or retainer member 11 is provided with an outer wall 13, a radially extending flange 15, a rear wall 17 and an inner nose portion 19. The inner nose portion 19 is provided with outwardly extending ribs 21 formed in the forward portion of the retainer member and circumferentially oriented, radially extending deformations 23 formed near the rear wall portion 17 of the retainer member 11.

A sealing washer or ring 25 is desirably molded of an antifriction substance such as a phenolic condensation product impregnated with graphite. The sealing washer 25 has an annular nose 27 which nose 27 is provided with a radially extending sealing face 29. The sealing washer 25 is provided with a central opening 31 and the opening is provided with longitudinally extending grooves 33 which cooperate with ribs 21 to provide a driving connection between the sealing washer 25 and the retainer 11.

An elastomeric sleeve 35 is provided with a rear flange 37 and a central cylindrical portion 39 which extends from the rear flange 37 to a shoulder 41 of the sealing washer 25. The elastomeric sleeve 35 also includes a radially extending front flange 43 and a forwardly extending tubular shroud 45. This shroud 45 is formed integral with and extends forwardly from the front flange 43 to a point ahead of the sealing face 29 of the sealing washer 25.

A front ferrule 47 provides a surface for the spring 49 to act against to maintain the elastomeric sleeve in operative engagement with the sealing washer 25. A rear ferrule 51 is provided in combination with the rear flange 37 to provide an engaging surface for spring 49.

The forwardly extending tubular shroud portion 45 of the elastomeric sleeve 35 extends forwardly past the front sealing face 29 of the sealing washer 25 and provides means to isolate the fluid being circulated by the impeller from the zone immediately adjacent the sealing washer nose 27.

Figure 3:
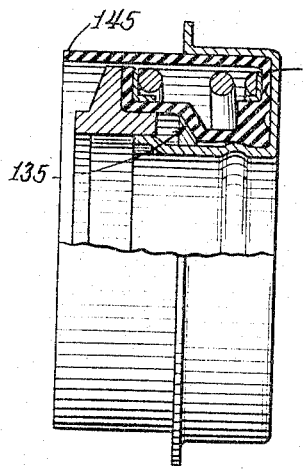
FIGURE 3 is a side view, partially in cross-section, of an alternate embodiment of the present invention.
Figure 2:
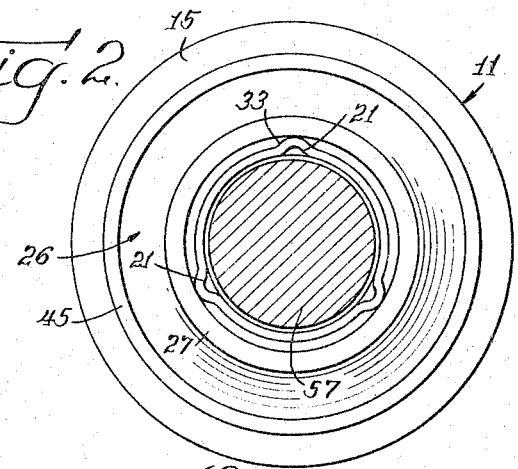
FIGURE 2 is an end view taken generally along lines 2—2 of FIGURE 1.

An alternate embodiment (FIGURE 3) includes a shroud 145 which, like the embodiment of FIGURE 1, is also formed as a part of the elastomeric sleeve 135. This shroud, however, is formed integral with the rear flange 137 of the elastomeric sleeve 135.

In operation, the seal assembly is installed such that the retainer 11 is fitted within a recess 53 formed in the housing 55. A pump shaft 57 extends through the housing 55 and is rotatably supported with respect thereto by bearing 59. The inner end of the shaft 57 supports a pump impeller 61. The pump chamber 63 as well as the exterior portion of the elastomeric sleeve is exposed to the fluid being circulated by the impeller 61. The forwardly extending shroud 45, however, isolates an annular zone 65 from the fluid circulating within the chamber 63. This, in turn, substantially increases the life of the seal assembly.

This seal assembly, relative to an assembly as illustrated in United States Patent 2,598,886, is less expensive, is easier to assemble, and exhibits improved operational life under conditions wherein an abrasive fluid is being circulated within the pump housing.

While certain preferred embodiments of the invention have been specifically disclosed, it is understood that the invention is not limited thereto, as many variations will be readily apparent to those skilled in the art and the invention is to be given its broadest possible interpretation within the terms of the following claims:

What is claimed is:

1. A seal comprising a retainer having a rear wall and a forwardly extending inner nose portion; a sealing washer mounted on said forwardly extending inner nose portion adapted to shift axially with respect to said retainer; said sealing washer having a radially disposed sealing face on the forward end thereof; an elastomeric sleeve including a rear flange in engagement with said rear wall and a front flange in engagement with said sealing washer; a tubular shroud formed integral with said front flange of said elastomeric sleeve extending forwardly over said sealing washer in a zone to provide a deflector means for said radially disposed sealing face; and resilient means interposed between said rear wall and said sealing washer whereby said sealing washer is normally urged away from said rear wall.

2. A seal comprising a retainer having a rear wall and a forwardly extending inner nose portion; a sealing washer mounted on said forwardly extending inner nose portion adapted to shift axially with respect to said retainer; said sealing washer having a radially disposed sealing face on the forward end thereof; an elastomeric sleeve including a rear flange in engagement with said rear wall and a front flange in engagement with said sealing washer; a tubular shroud formed integral with said rear flange of said elastomeric sleeve extending forwardly over said sealing washer in a zone to provide a deflector means for said radially disposed sealing face; and resilient means interposed between said rear wall and said sealing washer whereby said sealing washer is normally urged away from said rear wall.

References Cited by the Examiner
UNITED STATES PATENTS

| | | | |
|---|---|---|---|
| 2,598,886 | 6/1952 | Brummer | 277—42 |
| 2,784,016 | 3/1957 | Heimbuch | 277—86 |
| 2,785,913 | 3/1957 | Solari | 277—92 X |
| 2,823,057 | 2/1958 | Slight et al. | 277—32 |
| 2,856,210 | 10/1958 | Schoenrock | 277—89 X |
| 3,189,357 | 6/1965 | Talamonti | 277—42 |

SAMUEL ROTHBERG, *Primary Examiner.*